United States Patent
Shirata et al.

(10) Patent No.: US 11,090,716 B2
(45) Date of Patent: Aug. 17, 2021

(54) ε-IRON OXIDE TYPE FERROMAGNETIC POWDER AND MAGNETIC RECORDING MEDIUM

(71) Applicant: FUJIFILM Corporation, Tokyo (JP)

(72) Inventors: Masashi Shirata, Minami-ashigara (JP); Takashi Fujimoto, Minami-ashihara (JP)

(73) Assignee: FUJIFILM Corporation, Tokyo (JP)

( * ) Notice: Subject to any disclaimer, the term of this patent is extended or adjusted under 35 U.S.C. 154(b) by 146 days.

(21) Appl. No.: 15/825,469

(22) Filed: Nov. 29, 2017

(65) Prior Publication Data
US 2018/0147626 A1     May 31, 2018

(30) Foreign Application Priority Data
Nov. 30, 2016 (JP) .................... 2016-233609

(51) Int. Cl.
    *B22F 1/00*         (2006.01)
    *G11B 5/706*     (2006.01)
    *H01F 1/06*       (2006.01)

(52) U.S. Cl.
CPC ........ *B22F 1/0059* (2013.01); *G11B 5/70615* (2013.01); *G11B 5/70642* (2013.01); *H01F 1/06* (2013.01); *H01F 1/065* (2013.01); *B22F 2999/00* (2013.01)

(58) Field of Classification Search
None
See application file for complete search history.

(56) References Cited

U.S. PATENT DOCUMENTS

| | | | | |
|---|---|---|---|---|
| 8,444,872 B2 * | 5/2013 | Ohkoshi | ............... | B82Y 30/00 252/62.53 |
| 8,947,984 B2 * | 2/2015 | Hattori | .................... | G11B 5/73 369/13.14 |
| 10,807,880 B2 * | 10/2020 | Ohkoshi | ............... | C01G 49/06 |
| 2014/0219069 A1 | 8/2014 | Hattori et al. | | |
| 2018/0033528 A1 | 2/2018 | Sakane et al. | | |

FOREIGN PATENT DOCUMENTS

| | | |
|---|---|---|
| JP | 2007-281410 A | 10/2007 |
| JP | 2014-154178 A | 8/2014 |
| JP | 2016-169148 A | 9/2016 |
| WO | 2008/149785 A1 | 12/2008 |

OTHER PUBLICATIONS

Office Action dated Aug. 6, 2019 in corresponding Japanese Application No. 2016-233609.
Sakurai et al., Reorientation Phenomenon in a Magnetic Phase of ε-Fe₂O₃ Nanocrystal; Journal of the Physical Society of Japan, vol. 74, No. 7, Jul. 2005, pp. 1946-1949.
Marie Yoshikiyo, et al., "Unusual Temperature Dependence of Zero-Field Ferromagnetic Resonance in Millimeter Wave Region on Al-Substituted ε-Fe₂O₃", Ferromagnetic Resonance—Theory and Applications, InTech Open 2013, chapter 8, pp. 195-210.
Notice of Reasons for Revocation dated Oct. 5, 2020 issued in corresponding Japanese Patent Application No. 2016-233609 with its English Machine Translation; 19 pages total.

* cited by examiner

*Primary Examiner* — Kevin M Bernatz
(74) *Attorney, Agent, or Firm* — Sughrue Mion, PLLC

(57) ABSTRACT

Provided is an ε-iron oxide type ferromagnetic powder with a ratio $Hc_{173K}/Hc_{296K}$ between a coercive force $Hc_{173K}$ measured at a temperature of 173 K and a coercive force $Hc_{296K}$ measured at a temperature of 296 K is higher than 1.00 and less than 2.00, and a magnetic recording medium containing the ε-iron oxide type ferromagnetic powder in a magnetic layer.

16 Claims, No Drawings

ε-IRON OXIDE TYPE FERROMAGNETIC POWDER AND MAGNETIC RECORDING MEDIUM

CROSS-REFERENCE TO RELATED APPLICATIONS

This application claims priority under 35 U.S.C. 119 to Japanese Patent Application No. 2016-233609 filed on Nov. 30, 2016. The above application is hereby expressly incorporated by reference, in its entirety.

BACKGROUND OF THE INVENTION

1. Field of the Invention

The present invention relates to an ε-iron oxide type ferromagnetic powder and a magnetic recording medium.

2. Description of the Related Art

A ferromagnetic powder is widely used in various fields. In recent years, among the ferromagnetic powder, an ε-iron oxide type ferromagnetic powder has drawn attention (for example, see JP2007-281410A and WO2008/149785A1).

SUMMARY OF THE INVENTION

The ε-iron oxide type ferromagnetic powder can be used in the field of magnetic recording, for example. Specifically, the ε-iron oxide type ferromagnetic powder can be used as a ferromagnetic powder contained in a magnetic layer of a magnetic recording medium.

The magnetic recording medium is required to exhibit excellent electromagnetic conversion characteristics. Meanwhile, it is hard to say that the ε-iron oxide type ferromagnetic powder as a magnetic recording material is sufficiently studied for practical use, and currently, effective means for improving the electromagnetic conversion characteristics of the magnetic recording medium containing the ε-iron oxide type ferromagnetic powder in a magnetic layer has not yet been known.

Therefore, an object of the present invention is to provide an ε-iron oxide type ferromagnetic powder which can improve the electromagnetic conversion characteristics of a magnetic recording medium.

An aspect of the present invention relates to an ε-iron oxide type ferromagnetic powder (hereinafter, simply described as "ferromagnetic powder" as well) in which a ratio ($Hc_{173K}/Hc_{296K}$) between a coercive force $Hc_{173K}$ measured at a temperature of 173 K and a coercive force $Hc_{29K}$ measured at a temperature of 296 K is higher than 1.00 and less than 2.00.

In an aspect, the ferromagnetic powder comprises one or more kinds of elements selected from the group consisting of Co, Mn, and Ni.

In an ferromagnetic powder of the aspect, a content rate of the elements selected from the group consisting of Co, Mn, and Ni is equal to or higher than 1 at % and equal to or lower than 50 at % with respect to a total of 100 at % of Fe and the elements selected from the group consisting of Co, Mn, and Ni.

In an aspect, the ferromagnetic powder comprises an element capable of substituting Fe in an ε-iron oxide type crystal structure, and the element capable of substituting Fe in the ε-iron oxide type crystal structure consists of an element selected from the group consisting of Co, Mn, and Ni.

In an aspect, the ferromagnetic powder comprises at least Co.

In an aspect, the ratio is equal to or higher than 1.10 and equal to or lower than 1.90.

In an aspect, the ratio is equal to or higher than 1.20 and equal to or lower than 1.85.

In an aspect, the ferromagnetic powder is a ferromagnetic powder for magnetic recording.

Another aspect of the present invention relates to a magnetic recording medium comprising a non-magnetic support and a magnetic layer which is on the support and contains the ferromagnetic powder and a binder.

According to an aspect of the present invention, it is possible to provide an ε-iron oxide type ferromagnetic powder which can improve the electromagnetic conversion characteristics of a magnetic recording medium. Furthermore, according to another aspect of the present invention, it is possible to provide a magnetic recording medium which contains the ε-iron oxide type ferromagnetic powder and can exhibit excellent electromagnetic conversion characteristics.

DESCRIPTION OF THE PREFERRED EMBODIMENTS

ε-Iron Oxide Type Ferromagnetic Powder

The ferromagnetic powder according to an aspect of the present invention is an ε-iron oxide type ferromagnetic powder having an ε-iron oxide type crystal structure, in which a ratio ($Hc_{173K}/Hc_{296K}$) between a coercive force $Hc_{173K}$ measured at a temperature of 173 K and a coercive force $Hc_{296K}$ measured at a temperature of 296 K is higher than 1.00 and less than 2.00. Hereinafter, the ratio will be described as a ratio $Hc_{173K}/Hc_{296K}$ as well.

The ferromagnetic powder is an ε-iron oxide type ferromagnetic powder. In the present invention and the present specification, the "ε-iron oxide type ferromagnetic powder" refers to a ferromagnetic powder from which an ε-iron oxide type crystal structure is detected as a main phase by X-ray diffractometry. The main phase refers to a structure to which a diffraction peak of the highest intensity is attributed in an X-ray diffraction spectrum obtained by X-ray diffractometry. For example, in a case where a diffraction peak of the highest intensity is attributed to an ε-iron oxide type crystal structure in an X-ray diffraction spectrum obtained by X-ray diffractometry, it is decided that the ε-iron oxide type crystal structure is detected as a main phase. In a case where only a single structure is detected by X-ray diffractometry, the detected structure is regarded as a main phase.

Hereinafter, the ferromagnetic powder will be more specifically described.

Ratio $Hc_{173K}/Hc_{296K}$

In the ferromagnetic powder, a ratio ($Hc_{173K}/Hc_{296K}$) between a coercive force $Hc_{173K}$ measured at a temperature of 173 K and a coercive force $Hc_{296K}$ measured at a temperature of 296 K is higher than 1.00 and less than 2.00. As a result of performing an intensive examination, the inventors of the present invention newly found that an ε-iron oxide type ferromagnetic powder, in which the ratio ($Hc_{173K}/Hc_{296K}$) between the coercive force $Hc_{173K}$ measured at 173 K as an extremely low temperature and the coercive force $Hc_{296K}$ measured at 296 K as a temperature close to general room temperature is within the aforementioned range, can contribute to the improvement of the electromagnetic conversion characteristics of a magnetic recording medium. It is uncertain why the ratio affects the electromagnetic conversion characteristics of a magnetic recording medium. The inventors of the present invention consider that, presumably, in the ε-iron oxide type ferromagnetic powder in which the ratio $Hc_{173K}/Hc_{296K}$ is within the above range, the proportion of a component causing thermal spin fluctuation, that is, the proportion of a component not being able to be involved in magnetic recording may be low. However, the above consideration is merely a presumption, and the present invention is not limited thereto.

The aforementioned ratio is higher than 1.00. From the viewpoint of further improving the electromagnetic conversion characteristics, the ratio is preferably equal to or higher than 1.10, more preferably equal to or higher than 1.16, even more preferably equal to or higher than 1.18, and still more preferably equal to or higher than 1.20. The ratio is less than 2.00. From the viewpoint of further improving the electromagnetic conversion characteristics, the ratio is preferably equal to or lower than 1.90, more preferably equal to or lower than 1.85, and even more preferably equal to or lower than 1.80.

The coercive force Hc can be measured using a known vibrating sample magnetometer. In the present invention and the present specification, the temperature described regarding a coercive force is an atmospheric temperature of the periphery of the ferromagnetic powder at the time of measurement. The atmospheric temperature of the periphery of the ferromagnetic powder at the time of measurement can be controlled by various methods. An example of the temperature control methods will be shown in examples which will be described later.

The composition of the ferromagnetic powder is not limited as long as the ferromagnetic powder is an ε-iron oxide type ferromagnetic powder in which the ratio $Hc_{173K}/Hc_{296K}$ is higher than 1.00 and less than 2.00. Pure ε-iron oxide is represented by a compositional formula of $Fe_2O_3$, and is constituted with elements iron (Fe) and oxygen (O). The ε-iron oxide type ferromagnetic powder can contain one or more kinds of other elements in addition to Fe and O. The ε-iron oxide type ferromagnetic powder according to an aspect of the present invention may contain such elements, and in an aspect, it is preferable that the s-iron oxide type ferromagnetic powder contains such elements. In an aspect, the elements other than Fe and O can substitute Fe in the ε-iron oxide type crystal structure. Specifically, in the ε-iron oxide type crystal structure, the site of Fe can be substituted. For example, in an aspect, in a case where a lattice constant of the ε-iron oxide type crystal structure determined by X-ray diffractometry is different from a lattice constant of pure ε-iron oxide (ε-$Fe_2O_3$), it is possible to confirm that Fe is substituted with elements other than Fe and 0.

Regarding the elements other than Fe and O, through the examination, the inventors of the present invention obtained knowledge that the ferromagnetic powder preferably contains at least one kind of element which can have a valency of 2 (2+) (hereinafter, described as "divalent element" as well), and more preferably contains only a divalent element as an element which can substitute Fe in the ε-iron oxide type crystal structure (here, the ferromagnetic powder may contain only one kind of divalent element or two or more kinds of divalent elements). Accordingly, in an aspect, the ferromagnetic powder according to an aspect of the present invention preferably contains at least one kind of divalent element. Furthermore, in an aspect, the ferromagnetic powder more preferably contains only a divalent element as an element which can substitute Fe in the ε-iron oxide type crystal structure. That is, in a case where the ferromagnetic powder contains an element which can substitute Fe in the ε-iron oxide type crystal structure, the element more preferably includes a divalent element. The element which can substitute Fe in the ε-iron oxide type crystal structure is an element which can have a positive valency.

As the divalent element, an element having magnetism is more preferable. Examples of divalent elements preferred in this respect include Co, Mn, Ni, and the like. From the viewpoint of further improving the electromagnetic conversion characteristics, Co, Mn, and Ni are more preferable, and Co is even more preferable. In a case where the ferromagnetic powder contains a divalent element, the ferromagnetic powder may contain only one kind of divalent element or two or more kinds of divalent elements. Provided that the total content rate of Fe and the divalent element is 100 at %, the content rate of the divalent element in the ferromagnetic powder is preferably equal to or higher than 1 at % and equal to or lower than 50 at %, more preferably equal to or higher than 2 at % and equal to or lower than 40 at %, and even more preferably equal to or higher than 3 at % and equal to or lower than 20 at %. According to an aspect, in the ferromagnetic powder, the content rate of an element selected from the group consisting of Co, Mn, and Ni with respect to a total of 100 at % of the element selected from the group consisting of Co, Mn, and Ni and Fe is preferably equal to or higher than 1 at % and equal to or lower than 50 at %, more preferably equal to or higher than 2 at % and equal to or lower than 40 at %, and even more preferably equal to or higher than 3 at % and equal to or lower than 20 at %.

The content rate of various elements contained in the ferromagnetic powder can be determined by a known elementary analysis method. For example, by analyzing a solution obtained by dissolving a ferromagnetic powder by using an analyzer of inductively coupled plasma (ICP), the content rate of various elements contained in the ferromagnetic powder can be determined. As an example of the method for dissolving a ferromagnetic powder, a dissolution method in examples, which will be described later, can be exemplified. However, the present invention is not limited to the dissolution method in examples which will be described later, and various methods that make it possible to dissolve the ferromagnetic powder can be used. Furthermore, depending on the analyzer used for elementary analysis, the ferromagnetic powder can be analyzed in a powder state without being dissolved.

Average Particle Size

The ferromagnetic powder can be preferably a ferromagnetic powder for magnetic recording. From the viewpoint of accomplishing high-density recording in the field of magnetic recording, it is preferable that the average particle size of the ferromagnetic powder is small. In this respect, the average particle size of the ferromagnetic powder is preferably equal to or smaller than 35 nm, more preferably equal to or smaller than 30 nm, and even more preferably equal to or smaller than 25 nm. Furthermore, from the viewpoint of stability of magnetization, the average particle size of the ferromagnetic powder is preferably equal to or greater than 7 nm, more preferably equal to or greater than 8 nm, and even more preferably equal to or greater than 10 nm.

In the present invention and the present specification, the ferromagnetic powder means an aggregate of a plurality of ferromagnetic particles. The aggregate is not limited to an aspect in which the particles constituting the aggregate directly contact each other, and includes an aspect in which a binder, an additive, and the like which will be described later are interposed between the particles, for example. This point is also applied to various powders such as a non-magnetic powder in the present invention and the present specification. In the present invention and the present specification, the average particle size of various powders such as a ferromagnetic powder is a value measured by the following method by using a transmission electron microscope.

By using a transmission electron microscope, the powder is imaged at 100,000× imaging magnification and printed on printing paper such that the total magnification becomes 500,000×, thereby obtaining a photograph of the particles constituting the powder. From the obtained photograph of the particles, a particle of interest is selected, the outline of the particle is traced using a digitizer, and the size of the particle (primary particle) is measured. The primary particle refers to an independent particle that is not aggregated.

Five hundred particles are randomly extracted and measured as described above. The arithmetic mean of the particle sizes of 500 particles obtained in this way is taken as the average particle size of the powder. As the aforementioned transmission electron microscope, for example, it is possible to use a transmission electron microscope H-9000 manufactured by Hitachi, Ltd. Furthermore, for measuring the particle size, it is possible to use known image analysis software such as image analysis software KS-400 manufactured by Carl Zeiss AG. In examples which will be described later, the average particle size is measured using the transmission electron microscope H-9000 manufactured by Hitachi, Ltd. as a transmission electron microscope and image analysis software KS-400 manufactured by Carl Zeiss AG as image analysis software.

In the present invention and the present specification, the size of particles (particle size) constituting the powder is represented as below.

(1) In a case where the particles observed in the aforementioned photograph of particles have a needle shape, a spindle shape, a cylindrical shape (here, the height is larger than the maximum major axis of the bottom surface), the particle size is represented by the length of a long axis constituting the particles, that is, a long axis length.

(2) In a case where the particles observed in the aforementioned photograph of particles have a plate shape or a cylindrical shape (here, the thickness of the height is smaller than the maximum major axis of the plate surface or the bottom surface), the particle size is represented by the maximum major axis of the plate surface or the bottom surface.

(3) In a case where the particles observed in the aforementioned photograph of particles have a spherical shape, a polyhedral shape, an amorphous shape, and the like, and the long axis constituting the particles cannot be specified from the shape, the particle size is represented by a circle-equivalent diameter. The circle-equivalent diameter refers to a value determined by a circular projection method.

The average needle shape ratio of powders refers to the arithmetic mean of values obtained for the aforementioned 500 particles by measuring the length of a short axis of particles in the measurement described above, that is, a short axis length, and calculating a value of (long axis length/short axis length) for each of the particles. Herein, unless otherwise specified, the short axis length refers to the length of a short axis constituting the particles in the case of (1) relating to the definition of the particle size, and refers to the thickness or the height in the case of (2) relating to the definition of the particle size. In the case of (3), because a long axis and a short axis are not differentiated, (long axis length/short axis length) is regarded as 1 for the sake of convenience.

Furthermore, unless otherwise specified, in a case where the particles have a certain shape, for example, in a case of (1) relating to the definition of the particle size, the average particle size is the average long axis length, and in a case of (2) relating to the definition of the particle size, the average particle size is the average plate diameter, and the average plate shape ratio is the arithmetic mean of (maximum major axis/thickness or height). In the case of (3) relating to the definition of the particle size, the average particle size is the average diameter (referred to as an average particle size or an average particle diameter as well).

Method for Manufacturing Ferromagnetic Powder

The method for manufacturing the ferromagnetic powder is not limited as long as the ferromagnetic powder is an ε-iron oxide type ferromagnetic powder in which the ratio $Hc_{173K}/Hc_{296K}$ is higher than 1.00 and less than 2.00. The ferromagnetic powder can be manufactured by a method known as a method for manufacturing an ε-iron oxide type ferromagnetic powder. Regarding the manufacturing method, for example, it is possible to refer to the known techniques described in paragraphs "0017" to "0027 and examples in JP2008-174405A, paragraphs "0025" to "0054 and examples in WO2016/047559A1, paragraphs "0037" to "0045 and examples in WO2008/149785A1, and the like. For example, an Fe supply source for obtaining the ε-iron oxide type ferromagnetic powder may be used in the form of a solution obtained by dissolving iron hydroxide ($Fe(OH)_3$), iron oxyhydroxide (FeOOH), or the like in a solvent, or in the form of particles. Furthermore, in order to obtain the ε-iron oxide type ferromagnetic powder containing an element which can substitute Fe as described above, in a known manufacturing method, a portion of the compound that becomes an Fe supply source in ε-iron oxide may be substituted with the compound of the aforementioned element. By the amount of the compound substituted, the composition of the obtained ε-iron oxide type ferromagnetic powder can be controlled. Examples of the compound of the aforementioned element and the compound that becomes an Fe supply source include inorganic salts (hydrates may also be used) such as nitrate, sulfate, and chloride, hydroxides, oxyhydroxides, and the like.

According to the ferromagnetic powder in an aspect of the present invention described above, by using the ferromagnetic powder in a magnetic layer, it is possible to provide a magnetic recording medium which can exhibit excellent electromagnetic conversion characteristics. Therefore, it is preferable to use the ferromagnetic powder as a ferromagnetic powder for magnetic recording. Here, the ferromagnetic powder according to an aspect of the present invention can also be used in various fields in which an ε-iron oxide type ferromagnetic powder can be used, in addition to the field of magnetic recording. For example, the ferromagnetic powder can be used for absorbing radio waves. Accordingly, the ferromagnetic powder according to an aspect of the present invention can be used as a radio wave absorber (ferromagnetic powder for absorbing radio waves). In the present invention and the present specification, radio waves refer to electromagnetic waves having a frequency of equal to or shorter than 3,000 GHz. Furthermore, the ferromagnetic powder according to an aspect of the present invention can also be used in various fields in which an ε-iron oxide type ferromagnetic powder is used, such as various electronic materials, magnet materials, biomolecule labeling agents, and drug carriers.

Magnetic Recording Medium

An aspect of the present invention relates to a magnetic recording medium having a non-magnetic support and a magnetic layer which is on the support and contains the ferromagnetic powder according to an aspect of the present invention and a binder.

Hereinafter, the magnetic recording medium will be more specifically described.

Magnetic Layer

Ferromagnetic Powder

The details of the ferromagnetic powder contained in the magnetic layer of the magnetic recording medium are as described above. The average particle size of various powders contained in the magnetic recording medium, such as the ferromagnetic powder contained in the magnetic layer, may be measured using sample powders collected from the magnetic recording medium. As a method for collecting the sample powders from the magnetic recording medium so as to measure the average particle size, the method described in paragraph "0015" in JP2011-48878A can be exemplified.

The content rate (filling rate) of the ferromagnetic powder in the magnetic layer is preferably within a range of 50% to 90% by mass, and more preferably within a range of 60% to 90% by mass. The magnetic layer contains at least a binder as a component other than the ferromagnetic powder, and can optionally contain one or more kinds of additives. From the viewpoint of improving the recording density, it is preferable that the filling rate of the ferromagnetic powder in the magnetic layer is high.

Binder

The magnetic layer contains a binder together with the ferromagnetic powder. As the binder, one or more kinds of resins are used. The resins may be a homopolymer or a copolymer. As the binder contained in the magnetic layer, a binder selected from a polyurethane resin, a polyester resin, a polyamide resin, a vinyl chloride resin, an acryl resin obtained by copolymerizing styrene, acrylonitrile, methyl methacrylate, or the like, a cellulose resin such as nitrocellulose, an epoxy resin, a phenoxy resin, a polyvinyl alkyral resin such as polyvinyl acetal or polyvinyl butyral, and the like can be used singly, or a plurality of resins can be used by being mixed together. Among these, a polyurethane resin, an acryl resin, a cellulose resin, and a vinyl chloride resin are preferable. These resins can also be used as a binder in a non-magnetic layer and/or a back coating layer which will be described later. Regarding the binder, paragraphs "0029" to "0031" in JP2010-24113A can be referred to. The average molecular weight of the resin used as a binder can be, for example, equal to or greater than 10,000 and equal to or smaller than 200,000 as a weight-average molecular weight. In the present invention and the present specification, a weight-average molecular weight is a value determined by expressing a value, which is measured by gel permeation chromatography (GPC), in terms of polystyrene. As the measurement condition, the following condition can be exemplified. The weight-average molecular weight shown in examples which will be described later is a value determined by expressing a value, which is measured under the following measurement condition, in terms of polystyrene.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: tetrahydrofuran (THF)

If necessary, additives can be added to the magnetic layer. Examples of the additives include an abrasive, a lubricant, a dispersant, a dispersion aid, a fungicide, an antistatic agent, an antioxidant, carbon black, and the like. As the aforementioned additives, commercially available products can be appropriately selected and used according to desired properties. Furthermore, a curing agent can be added to a composition for forming a magnetic layer. By a curing reaction that proceeds in the process of manufacturing the magnetic recording medium, at least a portion of the curing agent can be contained in the magnetic layer in a state of reacting (cross-linked) with other components such as a binder. As the curing agent, polyisocyanate is preferable. For the details of polyisocyanate, paragraphs "0124" and "0125" in JP2011-216149A can be referred to. The amount of the used curing agent added to the composition for forming a magnetic layer is 0 to 80.0 parts by mass with respect to 100.0 parts by mass of the binder. From the viewpoint of improving hardness of the magnetic layer, the amount of the used curing agent added to the composition is preferably 50.0 to 80.0 parts by mass.

Non-Magnetic Layer

Next, the details relating to the non-magnetic layer will be described. The aforementioned magnetic recording medium may have the magnetic layer directly on the non-magnetic support, or may have the non-magnetic layer containing a non-magnetic powder and a binder between the non-magnetic support and the magnetic layer. The non-magnetic powder used in the non-magnetic layer may be an inorganic powder or an organic powder. Furthermore, carbon black and the like can also be used. Examples of the inorganic powder include powders of a metal, a metal oxide, a metal carbonate, a metal sulfate, a metal nitride, a metal carbide, a metal sulfide, and the like. These non-magnetic powders are available as commercial products, and can also be manufactured by a known method. For the details of the non-magnetic powder, for example, paragraphs "0036" to "0039" in JP2010-24113A can be referred to. The content rate (filling rate) of the non-magnetic powder in the non-magnetic layer is preferably within a range of 50% to 90% by mass, and more preferably within a range of 60% to 90% by mass.

As the binder, the lubricant, the dispersant, the additive, the solvent, the dispersion method, and the like of the non-magnetic layer, known techniques relating to the magnetic layer and/or a non-magnetic layer can be used. In addition, carbon black and/or organic powders can also be added to the non-magnetic layer. Regarding the carbon black and the organic powders, for example, paragraphs "0040" to "0042" in JP2010-24113A can be referred to.

Non-Magnetic Support

Examples of the non-magnetic support (hereinafter, simply described as "support" as well) include known supports such as biaxially oriented polyethylene terephthalate, polyethylene naphthalate, polyamide, polyamide imide, and aromatic polyamide. Among these, polyethylene terephthalate, polyethylene naphthalate, and polyamide are preferable. These supports may be subjected in advance to a corona discharge treatment, a plasma treatment, an easy adhesion treatment, a heat treatment, and the like.

Thickness of Non-Magnetic Support and Each Layer

Regarding the thickness of the non-magnetic support and each layer, the thickness of the non-magnetic support is preferably 3.0 to 80.0 μm. The thickness of the magnetic layer can be optimized according to the saturated magnetization amount of a magnetic head to be used, the head gap length, the band of recording signals, and the like. The thickness of the magnetic layer is generally 10 to 150 nm. From the viewpoint of accomplishing high-density recording, the thickness of the magnetic layer is preferably 20 to 120 nm, and more preferably 30 to 100 nm. The magnetic layer may be at least a single layer, or may be divided into two or more magnetic layers having different magnetic characteristics. The constitution relating to known multilayered magnetic layers can be adopted. Regarding the multilayered magnetic layer, the thickness of the magnetic layer means the total thickness of a plurality of magnetic layers.

The thickness of the non-magnetic layer is for example 0.05 to 3.0 μm, preferably 0.05 to 2.0 μm, and more preferably 0.05 to 1.5 μm. In the present invention and the present specification, the non-magnetic layer of the magnetic recording medium includes a substantially non-magnetic layer that contains a non-magnetic powder and a small amount of a ferromagnetic powder as an impurity, for example, or intentionally contains a small amount of a ferromagnetic powder. Herein, the substantially non-magnetic layer refers to a layer which has a residual magnetic flux density of equal to or lower than 10 mT or has a coercive force of equal to or smaller than 7.96 kA/m (100 Oe), or refers to a layer which has a residual magnetic flux density of equal to or lower than 10 mT and a coercive force of equal to or smaller than 7.96 kA/m (100 Oe). It is preferable that the non-magnetic layer does not have a residual magnetic flux density and a coercive force.

The thickness of each layer and the non-magnetic support in the magnetic recording medium can be determined by a known film thickness measurement method. For example, a cross-section of the magnetic recording medium in a thickness direction is exposed by a known technique using ion beams, a microtome, and the like, and then the exposed cross-section is observed using a scanning electron microscope. The thickness of each layer can be determined as a thickness measured at one site in the thickness direction during the observation of the cross-section, or as the arithmetic mean of thicknesses measured at a plurality of (two or more) randomly extracted sites, for example, at two sites. Alternatively, the thickness of each layer may be determined as a design thickness calculated from the manufacturing condition.

Back Coating Layer

The magnetic recording medium can have a back coating layer on a surface side of the non-magnetic support opposite to a surface side provided with the magnetic layer. It is preferable that the back coating layer contains carbon black and/or inorganic powders. Regarding the binder and various additives for forming the back coating layer, known techniques relating to the magnetic layer, the non-magnetic layer, and the back coating layer can be used. The thickness of the back coating layer is preferably equal to or smaller than 0.9 μm, and more preferably 0.1 to 0.7 μm.

Method for Manufacturing Magnetic Recording Medium

The process for manufacturing a composition for forming the magnetic layer, the non-magnetic layer, and the back coating layer generally includes at least a kneading step, a dispersion step, and a mixing step which is performed if necessary before and after the above steps. Each of the steps may be performed by being divided into two or more stages. Various components may be added at the early stage or in the middle of any step. Furthermore, each of the components may be added in divided portions in two or more steps. For example, a binder may be added in divided portions in the kneading step, the dispersion step, and the mixing step for adjusting the viscosity after dispersion. In order to manufacture the aforementioned magnetic recording medium, a manufacturing technique known in the related art can be used in some of the steps or all of the steps. For example, in the kneading step, it is preferable to use a kneader having a strong kneading force such as an open kneader, a continuous kneader, a pressurized kneader, or an extruder. For the details of the kneading treatment using these, JP1989-106338A (JP-H01-106338A) and JP1989-79274A (JP-H01-79274A) can be referred to. Furthermore, in order to disperse the composition for forming each layer, glass beads can be used as dispersion beads. As the dispersion beads, zirconia beads, titania beads, and still beads which are dispersion beads with a high specific gravity are also suitable. These dispersion beads can be used after the particle size (bead size) and the filling rate thereof are optimized. As a disperser, known dispersers can be used.

For the details of the method for manufacturing the magnetic recording medium, paragraphs "0051" to "0057" in JP2010-24113A can be referred to.

By containing the ferromagnetic powder according to an aspect of the present invention in the magnetic layer, the magnetic recording medium according to an aspect of the present invention described above can exhibit excellent electromagnetic conversion characteristics.

EXAMPLES

Hereinafter, the present invention will be more specifically described using examples, but the present invention is not limited to the aspects shown in the examples. In the following description, "part" and "%" represent "part by mass" and "% by mass" respectively.

Preparation of ε-Iron Oxide Type Ferromagnetic Powder

Example 1

(1) Preparation of Precursor-Containing Aqueous Solution

In a batch-type reaction tank including a stirring blade, an aqueous solution containing a precursor of an ε-iron oxide type ferromagnetic powder (precursor-containing aqueous solution) was obtained by the following method.

Iron (III) nitrate ($Fe(NO_3)_3 \cdot 9H_2O$) and a salt of an addition element M shown in Table 1 were dissolved in purified water in the reaction tank, thereby obtaining a raw material aqueous solution. The concentration of the aforementioned salt in the raw material aqueous solution was set to be the value shown in Table 1.

In a state where aqueous solution was being continuously stirred with the stirring blade, a 28% aqueous ammonia solution was added dropwise (speed of dropwise addition: 10 $cm^3$/min) to the reaction tank such that the pH of the aqueous solution in the reaction tank became 10.5, thereby preparing hydroxide sol (precursor-containing aqueous solution).

(2) Formation of Coat

Tetraethoxysilane (TEOS; tetraethyl orthosilicate) was added dropwise to the precursor-containing aqueous solution obtained in (1) such that the molar amount of Si becomes 10 times the molar amount of the Fe contained in iron (III) nitrate used for preparing the precursor-containing aqueous solution, and then the solution was stirred for 24 hours. By using a centrifuge, centrifugation was performed for 10 minutes at a rotation speed of 7,000 rpm, the precipitate was then collected and dried in an oven with an internal atmospheric temperature of 80° C., thereby obtaining a powder. On the powder obtained in this way, a Si-containing coat generated by the hydrolysis of TEOS was formed. Presumably, the Si-containing coat may be a coat of an oxide or hydroxide of Si.

(3) Calcination

The powder obtained in (2) was loaded into a muffle furnace and calcined for 4 hours in the atmosphere at an internal furnace temperature of 1,100° C.

(4) Coat Removing

The calcined substance obtained in (3) was added to a 4 mol/L aqueous sodium hydroxide solution, and the solution was stirred for 24 hours at a liquid temperature of 60° C., Except for the above point, the same steps as in the preparation of the ferromagnetic powder of Example 1 were performed, thereby obtaining ferromagnetic powders of Comparative Examples 2 to 4.

TABLE 1

| | Concentration in raw material aqueous solution | | | | | | |
|---|---|---|---|---|---|---|---|
| | | Salt of addition element | | | | | |
| | $Fe(NO_3)_3 \cdot 9H_2O$ | $Co(NO_3)_2 \cdot 6H_2O$ | $Mn(NO_3)_2 \cdot 6H_2O$ | $Ni(NO_3)_2 \cdot 6H_2O$ | $Ti(SO_4)_2$ | $Ga(NO_3)_2 \cdot 9H_2O$ | $In(NO_3)_3 \cdot 3H_2O$ |
| Example 1 | 0.51 mol/L | 0.09 mol/L | — | — | — | — | — |
| Example 2 | 0.56 mol/L | 0.045 mol/L | — | — | — | — | — |
| Example 3 | 0.59 mol/L | 0.015 mol/L | — | — | — | — | — |
| Comparative Example 1 | 0.60 mol/L | — | — | — | — | — | — |
| Example 4 | 0.51 mol/L | — | 0.09 mol/L | — | — | — | — |
| Example 5 | 0.51 mol/L | — | — | 0.09 mol/L | — | — | — |
| Comparative Example 2 | 0.58 mol/L | 0.045 mol/L | — | — | 0.045 mol/L | — | — |
| Comparative Example 3 | 0.42 mol/L | 0.015 mol/L | — | — | 0.045 mol/L | 0.09 mol/L | — |
| Comparative Example 4 | 0.54 mol/L | — | — | — | — | — | 0.060 mol/L |
| Example 6 | 0.45 mol/L | 0.15 mol/L | — | — | — | — | — |
| Example 7 | 0.33 mol/L | 0.27 mol/L | — | — | — | — | — | thereby removing the coat formed in (2). Then, by using a centrifuge, centrifugation was performed for 10 minutes at a rotation speed of 7,000 rpm, the precipitate was then collected and dried in an oven with an internal atmospheric temperature of 80° C.

In the manner described above, a ferromagnetic powder of Example 1 was obtained.

Examples 2 to 7

Iron (III) nitrate ($Fe(NO_3)_3 \cdot 9H_2O$) and a salt of an addition element M shown in Table 1 were dissolved in purified water in a reaction tank, thereby obtaining a raw material aqueous solution. The concentration of the aforementioned salt in the raw material aqueous solution was set to be the value shown in Table 1.

Except for the above point, the same steps as in the preparation of the ferromagnetic powder of Example 1 were performed, thereby obtaining ferromagnetic powders of Examples 2 to 7.

Comparative Example 1

A ferromagnetic powder of Comparative Example 1 was obtained by performing the same steps as in the preparation of the ferromagnetic powder of Example 1, except that the salt of the addition element M was not used, and that the concentration of iron (III) nitrate ($Fe(NO_3)_3 \cdot 9H_2O$) in the raw material aqueous solution was set to be the value shown in Table 1.

Comparative Examples 2 to 4

Iron (III) nitrate ($Fe(NO_3)_3 \cdot 9H_2O$) and a salt of an addition element M shown in Table 1 were dissolved in purified water in the reaction tank, thereby obtaining a raw material aqueous solution. The concentration of the aforementioned salt in the raw material aqueous solution was set to be the value shown in Table 1.

Method for Evaluating Ferromagnetic Powder (1) X-Ray Diffractometry

A sample powder was collected from each of the ferromagnetic powders of the examples and the comparative examples and analyzed by X-ray diffractometry. As a result of the analysis, it was confirmed that all of the ferromagnetic powders are ε-iron oxide type ferromagnetic powders.

(2) Elementary Composition of Ferromagnetic Powder 12 mg of sample powder was collected from each of the ferromagnetic powders of the examples and the comparative examples and put into a container containing 10 ml of 4 mol/L hydrochloric acid.

The container was kept on a hot plate with a set temperature of 80° C. for 3 hours, thereby obtaining a solution of a ferromagnetic powder. As a result of visually observing the solution, solid contents were not observed, which led to a conclusion that the ferromagnetic powder completely dissolved.

The aforementioned solution was filtered through a membrane filter with a pore size of 0.1 μm. The obtained filtrate was subjected to elementary analysis by using an inductively coupled plasma (ICP)-Auger electron spectroscopy (AES) analyzer, thereby determining the elementary composition thereof.

(3) Measurement of Coercive Force Hc

The coercive force Hc of each of the ferromagnetic powders of the examples and the comparative examples was measured at a magnetic field intensity of 1,154 kA/m (15 kOe) by using a vibrating sample magnetometer (manufactured by TOEI INDUSTRY CO., LTD.).

The coercive force $Hc_{296K}$ is a value measured under the atmospheric pressure at room temperature (296 K) after filling an aluminum cell with each of the ferromagnetic powders of the examples and the comparative example. By a thermocouple set in the aluminum cell filled with the ferromagnetic powder, it was confirmed that the atmospheric temperature of the periphery of the ferromagnetic powder at the time of measurement is 296 K. Although the measurement was performed at room temperature herein, in a case where the room temperature is a temperature other than 296 K, by performing temperature control by a known method, the temperature of the ferromagnetic powder to be measured can be controlled and become 296 K.

For determining the coercive force $Hc_{173K}$, an aluminum cell was filled with each of the ferromagnetic powders of the examples and the comparative examples, temperature control was then performed, the atmospheric temperature of the periphery of the ferromagnetic powder was measured using a thermocouple set in the vicinity of the cell, and the coercive force $Hc_{173K}$ Was measured in a state where the atmospheric temperature of the periphery of the ferromagnetic powder was 173 K. The temperature control was performed by inserting the entirety of a vibrating sample rod (the aluminum cell was disposed on the inside of the rod) of the vibrating sample magnetometer into a quartz pipe, the quartz pipe was immersed in a Dewar flask filled with liquid nitrogen while being evacuated by a rotary pump, and applying an electric current to an electric heater mounted on the quartz pipe.

Preparation of Magnetic Recording Medium (Magnetic Tape)

(1) Formulation of Composition for Forming Magnetic Layer (Magnetic Solution)

Ferromagnetic powder (ferromagnetic powder of each of the examples or the comparative examples described above): 100.0 parts Polyurethane resin containing $SO_3Na$ group (weight-average molecular weight: 70,000, $SO_3Na$ group: 0.4 meq/g): 14.0 parts Cyclohexanone: 150.0 parts Methyl ethyl ketone: 150.0 parts (Abrasive solution)

Alumina abrasive (average particle size: 100 nm): 3.0 parts

Polyurethane resin containing $SO_3Na$ group (weight-average molecular weight: 70,000, $SO_3Na$ group: 0.3 meq/g): 0.3 parts Cyclohexanone: 26.7 parts Diamond abrasive (average particle size: 100 nm): 1.0 part Polyurethane resin containing $SO_3Na$ group (weight-average molecular weight: 70,000, $SO_3Na$ group: 0.3 meq/g): 0.1 parts Cyclohexanone: 26.7 parts (Silica sol)

Colloidal silica (average particle size: 100 nm): 0.2 parts

Methyl ethyl ketone: 1.4 parts (Other components)

Stearic acid: 2.0 parts

Butyl stearate: 6.0 parts

Polyisocyanate (CORONATE manufactured by Nippon Polyurethane Industry Co., Ltd.): 2.5 parts (Solvents Added for Finishing)

Cyclohexanone: 200.0 parts

Methyl ethyl ketone: 200.0 parts (2) Formulation of Composition for Forming Non-Magnetic Layer Non-magnetic inorganic powder α-iron oxide: 100.0 parts Average particle size: 10 nm Average needle shape ratio: 1.9

Brunauer-Emmett-Teller (BET) specific surface area: 75 $m^2/g$

Carbon black (average particle size: 20 nm): 25.0 parts

Polyurethane resin containing $SO_3Na$ group (weight-average molecular weight: 70,000, $SO_3Na$ group: 0.2 meq/g): 18.0 parts Stearic acid: 1.0 part Cyclohexanone: 300.0 parts Methyl ethyl ketone: 300.0 parts (3) Formulation of Composition for Forming Back Coating Layer Non-magnetic inorganic powder α-iron oxide: 80.0 parts Average particle size: 0.15 μm Average needle shape ratio: 7

BET specific surface area: 52 $m^2/g$

Carbon black (average particle size: 20 nm): 20.0 parts

Vinyl chloride copolymer: 13.0 parts

Polyurethane resin containing sulfonic acid group: 6.0 parts

Phenyl phosphonate: 3.0 parts

Cyclohexanone: 155.0 parts

Methyl ethyl ketone: 155.0 parts

Stearic acid: 3.0 parts

Butyl stearate: 3.0 parts

Polyisocyanate: 5.0 parts

Cyclohexanone: 200.0 parts (4) Preparation of Magnetic Tape

A composition for forming a magnetic layer was prepared by the following method.

The aforementioned magnetic solution was dispersed for 24 hours by using a batch-type vertical sand mill. As dispersion beads, zirconia beads having a particle size of 0.5 mm were used. The abrasive solution was dispersed for 24 hours by using a batch-type ultrasonic device (20 kHz, 300 W).

The magnetic solution and the abrasive solution described above were mixed with the rest of the components (silica sol, other components, and the solvents added for finishing) and then treated with ultrasonic waves for 30 minutes by using a batch-type ultrasonic device (20 kHz, 300 W). Then, the solution was filtered through a filter having an average pore size of 0.5 μm, thereby preparing a composition for forming a magnetic layer.

A composition for forming a non-magnetic layer was prepared by the following method.

The aforementioned various components were dispersed for 24 hours by using a batch-type vertical sand mill. As dispersion beads, zirconia beads having a particle size of 0.1 mm were used. The obtained dispersion liquid was filtered through a filter having an average pore size of 0.5 μm, thereby preparing a composition for forming a non-magnetic layer.

A composition for forming a back coating layer was prepared by the following method.

Various components described above except for the lubricants (stearic acid and butyl stearate), polyisocyanate, and 200.0 parts of cyclohexanone were kneaded and diluted using an open kneader. Then, in a horizontal bead mill disperser, the kneaded components were subjected to 12 passes of a dispersion treatment by using zirconia beads having a particle size of 1 mm, under the conditions of a bead filling rate of 80% by volume, a circumferential speed of a rotor tip of 10 m/sec, and a retention time for 1 pass of 2 minutes. The rest of the components was added to the dispersion liquid obtained in this way and stirred using a dissolver. The obtained dispersion liquid was filtered through a filter having an average pore size of 1 μm, thereby preparing a composition for forming a back coating layer.

Thereafter, a support made of polyethylene naphthalate having a thickness of 5 μm was coated with the composition for forming a non-magnetic layer and dried such that the thickness after drying became 0.1 μm. Then, the support was coated with the composition for forming a magnetic layer such that the thickness after drying became 70 nm, thereby forming a coating layer. In a state where the coating layer of the composition for forming a magnetic layer was not yet dried, a vertical alignment treatment was performed on the coating layer by applying a magnetic field having a magnetic field intensity of 0.6 T thereto in a direction perpendicular to the surface of the coating layer, followed by drying. Subsequently, a surface of the support opposite to a surface on which the non-magnetic layer and the magnetic layer were formed was coated with the composition for forming a back coating layer and then dried such that the thickness after drying became 0.4 μm.

Thereafter, by using a calender constituted only with a metal roll, a surface smoothing treatment (calender treatment) was performed at a speed of 100 m/min, a line pressure of 300 kg/cm (294 kN/m), and a surface temperature of the calender roll of 100° C., and then a heat treatment was performed for 36 hours in an environment with an atmospheric temperature of 70° C. After the heat treatment, the film was slit in a width of ½ inches (0.0127 meters), thereby obtaining a magnetic tape. Hereinafter, the magnetic tape containing the ferromagnetic powder of Example 1 will be referred to as a magnetic tape of Example 1. The same shall be applied to other examples and comparative examples.

Method for Evaluating Electromagnetic Conversion Characteristics (Signal-to-Noise-Ratio (SNR)) of Magnetic Tape On each of the magnetic tapes of the examples and the comparative examples, magnetic signals were recorded in the longitudinal direction of the magnetic tape under the following condition, and the signals were reproduced using a magnetoresistive (MR) head. The frequency of the reproduced signals was analyzed using a spectrum analyzer manufactured by Shibasoku Co., Ltd., and a ratio between an output of 300 kfci and noise integrated in a range of 0 to 600 kfci was taken as SNR. The unit kfci is the unit (not being able to be converted into SI unit) of linear recording density.

(Condition for Recording and Reproducing)
Recording: width of recording track 5 μm
Recording gap 0.17 μm
Saturated magnetic flux density Bs of head 1.8 T
Reproducing: width of reproducing track 0.4 μm
Inter-shield (sh) distance (sh-sh distance) 0.08 μm
Recording wavelength: 300 kfci The results of the evaluation described above are shown in Table 2.

TABLE 2

| | Elementary composition: content rate with respect to 100 at % of Fe + M | | | | | | | | |
|---|---|---|---|---|---|---|---|---|---|
| | | | | M | | | | $Hc_{173K}/$ | |
| | Fe | Co | Mn | Ni | Ti | Ga | In | $Hc_{296K}$ | SNR |
| Example 1 | 87 | 13 | | | | | | 1.22 | +2.8 dB |
| Example 2 | 92 | 8 | | | | | | 1.52 | +2.5 dB |
| Example 3 | 97 | 3 | | | | | | 1.85 | +2.2 dB |
| Comparative Example 1 | 100 | | | | | | | 2.24 | ±0.0 dB |
| Example 4 | 91 | | 9 | | | | | 1.48 | +2.0 dB |
| Example 5 | 90 | | | 10 | | | | 1.40 | +1.9 dB |
| Comparative Example 2 | 84 | 7 | | | 9 | | | 2.18 | +0.2 dB |
| Comparative Example 3 | 71 | 8 | | | 9 | 12 | | 2.11 | +0.4 dB |
| Comparative Example 4 | 97 | | | | | | 8 | 0.95 | −0.1 dB |
| Example 6 | 79 | 21 | | | | | | 1.18 | +1.5 dB |
| Example 7 | 58 | 42 | | | | | | 1.15 | +1.3 dB |

From the results shown in Table 2, it is possible to confirm that the magnetic tapes of the examples containing an ε-iron oxide type ferromagnetic powder, in which the ratio $Hc_{173K}/Hc_{296K}$ is higher than 1.00 and less than 2.00, in a magnetic layer exhibit electromagnetic conversion characteristics (high SNR) better than electromagnetic conversion characteristics of the magnetic tapes of the comparative examples.

The present invention is useful in various technical fields such as the field of magnetic recording.

What is claimed is:

1. An √-iron oxide type ferromagnetic powder for use in a magnetic layer of a magnetic recording medium, comprising one or more elements from the group consisting of Co, Mn, and Ni,
    wherein a ratio $Hc_{173K}/Hc_{296K}$ between a coercive force $Hc_{173K}$ measured at a temperature of 173 K and a coercive force $Hc_{296K}$ measured at a temperature of 296 K is higher than 1.00 and less than 2.00.

2. The √-iron oxide type ferromagnetic powder according to claim 1,
    wherein a content rate of the elements selected from the group consisting of Co, Mn, and Ni is equal to or higher than 1 at % and equal to or lower than 50 at % with respect to a total of 100 at % of Fe and the elements selected from the group consisting of Co, Mn, and Ni.

3. The √-iron oxide type ferromagnetic powder according to claim 1, comprising:
    an element capable of substituting Fe in an √-iron oxide type crystal structure,
    wherein the element capable of substituting Fe in the √-iron oxide type crystal structure consists of an element selected from the group consisting of Co, Mn, and Ni.

4. The √-iron oxide type ferromagnetic powder according to claim 1,
    wherein the √-iron oxide type ferromagnetic powder contains at least Co.

5. The √-iron oxide type ferromagnetic powder according to claim 1,
    wherein the ratio is equal to or higher than 1.10 and equal to or lower than 1.90.

6. The ε-iron oxide type ferromagnetic powder according to claim 1,
wherein the ratio is equal to or higher than 1.20 and equal to or lower than 1.85.

7. The ε-iron oxide type ferromagnetic powder according to claim 1,
wherein the ratio $Hc_{173K}/Hc_{296K}$, is equal to or higher than 1.15 and equal to or lower than 1.85.

8. The ε-iron oxide type ferromagnetic powder according to claim 1,
wherein the ratio $Hc_{173K}/Hc_{296K}$ is equal to or higher than 1.18 and less than 2.00.

9. A magnetic recording medium comprising:
a non-magnetic support; and
a magnetic layer which is on the support and contains a ferromagnetic powder and a binder,
wherein the ferromagnetic powder is an ε-iron oxide type ferromagnetic powder comprising one or more elements selected from the group consisting of Co, Mn, and Ni, wherein a ratio $Hc_{173K}/Hc_{296K}$ between a coercive force $Hc_{173K}$ measured at a temperature of 173 K and a coercive force $Hc_{296K}$ measured at a temperature of 296 K is higher than 1.00 and less than 2.00.

10. The magnetic recording medium according to claim 9,
wherein a content rate of the elements selected from the group consisting of Co, Mn, and Ni in the ε-iron oxide type ferromagnetic powder is equal to or higher than 1 at % and equal to or lower than 50 at % with respect to a total of 100 at % of Fe and the elements selected from the group consisting of Co, Mn, and Ni.

11. The magnetic recording medium according to claim 9,
wherein the ε-iron oxide type ferromagnetic powder comprises an element capable of substituting Fe in an ε-iron oxide type crystal structure, and the element capable of substituting Fe in the ε-iron oxide type crystal structure consists of an element selected from the group consisting of Co, Mn, and Ni.

12. The magnetic recording medium according to claim 9,
wherein the ε-iron oxide type ferromagnetic powder contains at least Co.

13. The magnetic recording medium according to claim 9,
wherein the ratio of the ε-iron oxide type ferromagnetic powder is equal to or higher than 1.10 and equal to or lower than 1.90.

14. The magnetic recording medium according to claim 9,
wherein the ratio of the ε-iron oxide type ferromagnetic powder is equal to or higher than 1.20 and equal to or lower than 1.85.

15. The magnetic recording medium according to claim 9,
wherein the ratio $Hc_{173K}/Hc_{296K}$, is equal to or higher than 1.15 and equal to or lower than 1.85.

16. The magnetic recording medium according to claim 9,
wherein the ratio $Hc_{173K}/Hc_{296K}$ is equal to or higher than 1.18 and less than 2.00.

* * * * *